March 8, 1938.  H. G. BRAUER  2,110,788
BURIAL VAULT
Filed May 26, 1936  2 Sheets-Sheet 1
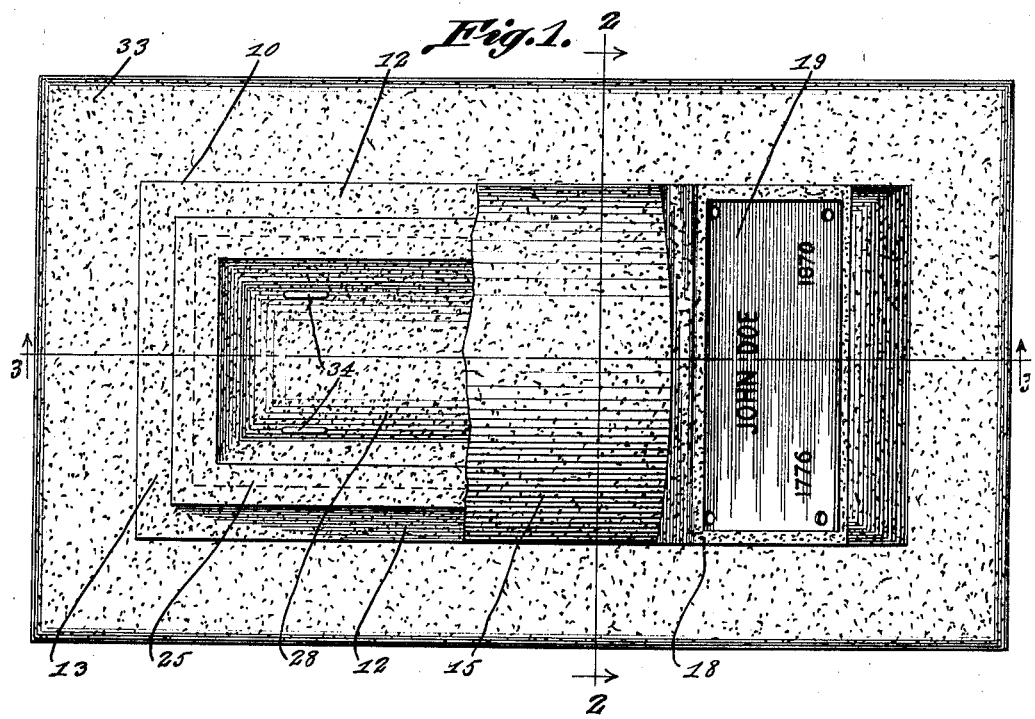
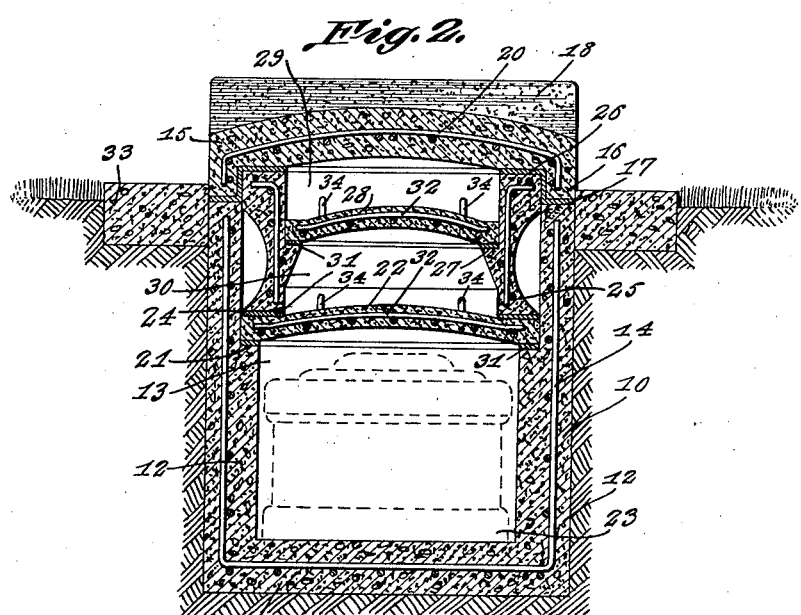
Herman G. Brauer, INVENTOR
BY Victor J. Evans & Co.
ATTORNEYS March 8, 1938.   H. G. BRAUER   2,110,788
BURIAL VAULT
Filed May 26, 1936   2 Sheets-Sheet 2

Herman G. Brauer, INVENTOR

Patented Mar. 8, 1938

2,110,788

UNITED STATES PATENT OFFICE 2,110,788

BURIAL VAULT

Herman G. Brauer, Polk, Nebr.

Application May 26, 1936, Serial No. 81,935

3 Claims. (Cl. 72—7)

The invention relates to burial vaults and more especially to individual mausoleums or surface burial vaults.

The primary object of the invention is the provision of a mausoleum or vault of this character, wherein the same has its top sealing plate exposed above ground while the body of the vault is sunken in the ground and interiorly of the said body is created double air chambers, these being located where needed to keep out frost and heat and maintain even temperature and dryness throughout the vault and casket chamber.

Another object of the invention is the provision of a mausoleum or vault of this character, wherein the same is formed from material that will withstand the ravages of time and the elements and the interior thereof will be maintained constantly dry, the cover plate for the double air chamber being fitted in a novel manner and within the vault or mausoleum and in such a manner as to render the casket chamber air and water tight so that the contents of the vault or mausoleum will be maintained dry throughout the life of the mausoleum or vault.

A further object of the invention is the provision of a mausoleum or vault of this character, wherein the top cover plate has a raised slab formation constituting a marking area for an inscription.

A still further object of the invention is the provision of a vault of this character, which is simple in its construction, thoroughly reliable and efficient in its operation, artistic and attractive in appearance, possessed of maximum life and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a top plan view of a vault constructed in accordance with the invention and its cover plate being partly removed.

Figure 2 is a sectional view on the line 2—2 of Figure 1 looking in the direction of the arrows.

Similar reference characters indicate corresponding parts throughout the several views in the drawings.

Figure 3:
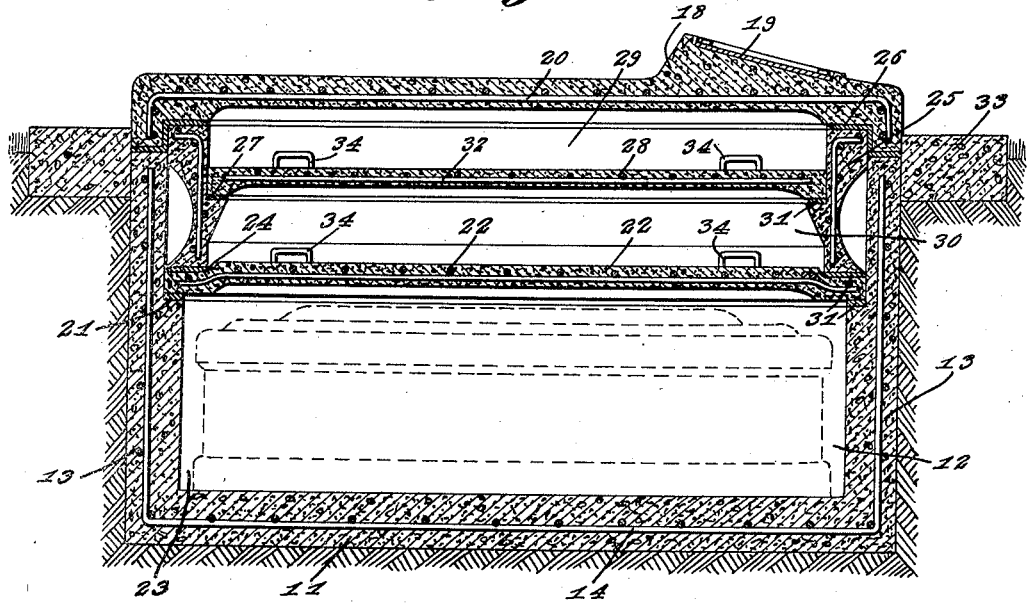
Figure 3 is a vertical longitudinal sectional view.
Figure 4:
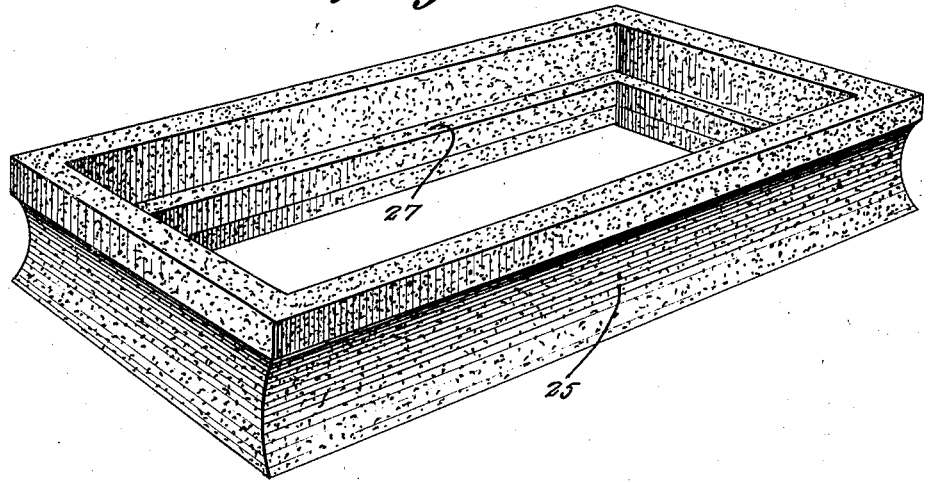
Figure 4 is a perspective view of the walling frame for the double air chamber created interiorly of the vault or mausoleum.

Referring to the drawings in detail, the mausoleum or vault which is individual in kind comprises a substantially rectangular shaped body 10 which is formed from cementitious material or the like precast into body formation and has a solid bottom 11 with vertical side and end walls 12 and 13, respectively, these being of the required thickness and rise from the bottom to present an open top to the latter. Embedded in the body 10 are reinforcements 14 in the form of metal rods or the like to give strength to the body.

Closing the open top of the body 10 is an upwardly arched cover plate 15 which is made from material similar to that from which the body is made and provided on this plate is a depending marginal rim 16 for matching the edge of the open top of said body while interposed between this edge and the said rim 16 is a sealing medium 17 for the permanent sealing of the cover plate 15 when fitted upon the open top of the body 10.

Built with the cover plate 15 is a raised flat faced inclined slab 18 constituting a marking area for an inscription or for the carrying of an inscription plate 19. This cover plate 15 has embedded therein reinforcing mediums 20 preferably in the form of metal rods.

Interiorly of the body 10 inset the required distance removed from the open top is a rest shoulder or ledge 21, the same being formed from the side and end walls 12 and 13 of said body for supporting an internal sealing plate 22 for a casket chamber 23 provided in the lower portion of said body 10. Marginally of this sealing plate 22 is a continuous seat 24 for a walling frame 25 which snugly fits within the body 10 to slightly protrude through the open top thereof and become seated at 26 in the cover plate 15 when upon the body 10. The walling frame 25 is formed intermediate of the top and bottom edges thereof with an internal seating ledge 27 for a second sealing plate 28 which rests thereon and divides the said frame 25 above the plate 22 and between it and the cover plate 15 into independent air chambers 29 and 30, respectively, so that there is created interiorly of the body 10 a double air chamber, the sealing plates being sealed in position by a sealing medium 31. Thus this double air chamber is provided in the body 10 where needed the most to keep out frost and heat and maintain even temperature and dryness throughout the casket chamber 23 or throughout the entire vault or mausoleum.

These sealing plates 22 and 28 have embedded therein metallic reinforcements 32 for strength and durability.

The body 10 of the mausoleum or vault is sunken in a foundation at the ground level while surrounding this open top is a curb 33 and when the cover plate 15 is sealed to the body 10 for closing the open top it will rise slightly above the ground level to be exposed to view and likewise the slab 18 carrying the inscription will be readily discernible.

The sealing plates 22 and 28 are fitted with suitable loop handles 34 for convenience in the application or removal of such plates. The sealing medium 17 for the cover plate 15 is carried into the seat 26 for the frame 25.

The mausoleum or vault by the creation of the double air chamber and the assembly of the sealing plates and cover plate will maintain the casket chamber 23 dry, frost, air and water tight while the material from which the vault or mausoleum is made will withstand the ravages of time and the elements.

What is claimed is:

1. A vault of the character described comprising a body open at its top and having a rest ledge interiorly thereof, a sealing plate sealed upon said ledge and forming a casket chamber beneath said plate, a walling frame superimposed upon the sealing plate and having an internal ledge intermediate the upper and lower edges of the frame, a sealing plate sealed to the last-mentioned ledge in spaced relation to the first sealing plate thereby effecting a double air chamber uppermost with respect to the casket chamber, and a cover plate closing the open top of said body.

2. A vault of the character described comprising a body open at its top and having a rest ledge interiorly thereof, a sealing plate sealed upon said ledge and forming a casket chamber beneath said plate, a walling frame superimposed upon the sealing plate and being of such a height as to extend above the top edge of the body and having an internal ledge intermediate its upper and lower edges, a sealing plate sealed to the last-mentioned ledge in spaced relation to the first sealing plate and effecting a double air chamber uppermost with respect to the casket chamber, a cover plate closing the open top of said body, and a marginal flange formed on the cover plate and sealed to the edge of the open top of said body and having horizontal and vertical seats for the walling frame.

3. A vault of the character described comprising a body having a casket receiving chamber and an open top, means closing said chamber, and means including a walling frame superimposed upon said chamber closing means and cooperating with the walls of said body, a sealing plate sealed to said walling frame, and a cover plate closing the open top of the body for providing an air chamber disposed above said casket receiving chamber, a second air chamber disposed above the first air chamber and a third air chamber disposed above the casket receiving chamber and encircling the first air chamber, said air chamber forming means preventing the passage of moisture and air between the air chambers and the casket receiving chamber.

HERMAN G. BRAUER.